3,347,571
HOSE FITTING
Truman L. New, Fort Worth, Tex., assignor to Stratoflex, Inc., Fort Worth, Tex., a corporation of Texas
Continuation of abandoned application Ser. No. 187,886, Apr. 16, 1962. This application Aug. 30, 1965, Ser. No. 483,558
3 Claims. (Cl. 285—149)

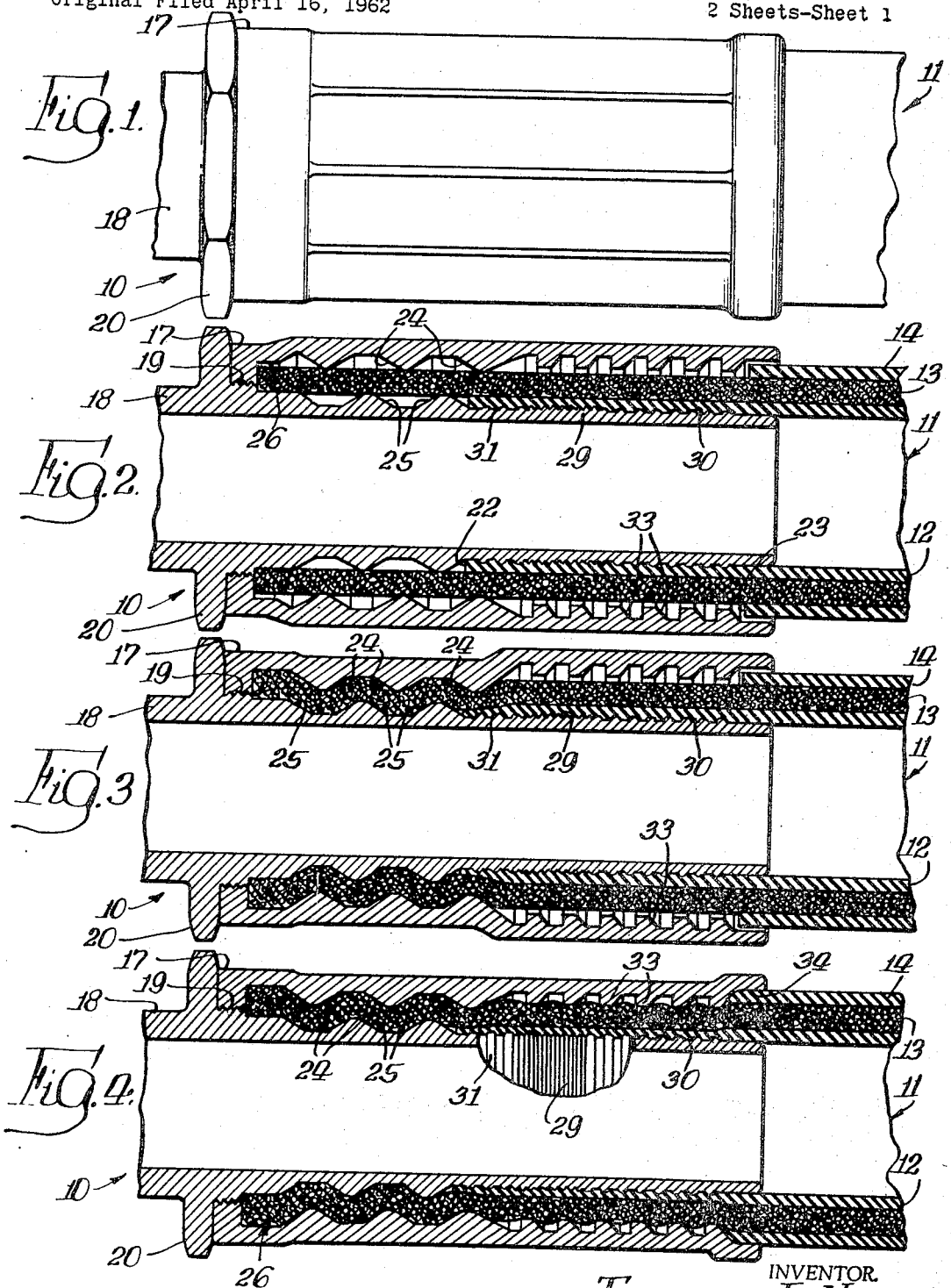

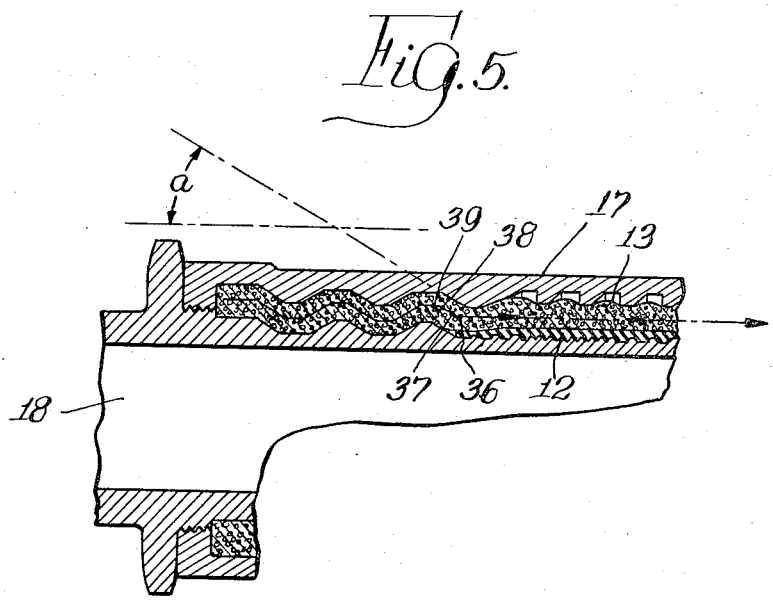
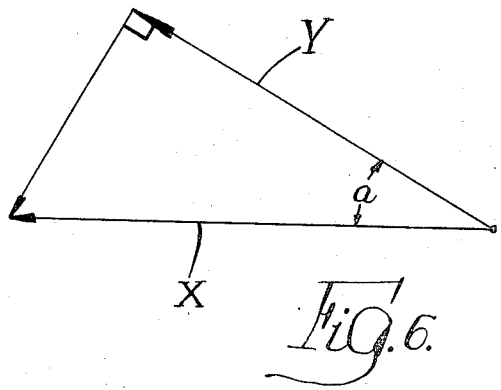

This patent application is a continuation of my co-pending application Ser. No. 187,886 filed Apr. 16, 1962, now abandoned.

This invention relates to hose fittings and, more particularly, to a hose fitting for use with hose having wire reinforcement and to a method of assembly of the fitting.

It is a primary object of this invention to provide a novel hose fitting that grips a hose firmly without danger of cutting or tearing the hose.

It is another object to provide a novel hose fitting that grips the wire reinforcement of the hose with a radial compressive force that is substantially constant throughout the axial length of the gripped portion.

Other objects and advantages of the invention will become apparent from the following detailed description taken in conjunction with the accompanying figures of the drawing, in which:

FIG. 1 is an elevational view of a hose and fitting assembly embodying the invention;

FIG. 2 is a sectional view of the assembly before crimping;

FIG. 3 is a sectional view of the assembly in a partially crimped condition;

FIG. 4 is a sectional view of the assembly in a fully crimped condition;

FIG. 5 is a fragmentary sectional viewing showing the stresses on the hose; and

FIG. 6 is a vector diagram used in computing the stresses on the hose.

In general, the fitting is adapted to be used with a hose including an inner tube, a wire reinforcement, and an outer cover, and comprises a socket and a nipple, the nipple extending through the socket in telescopic relation and being secured thereto. The socket and the nipple define an annular opening therebetween which receives the end of the hose, the socket being positioned over the end of the hose and the nipple being inserted into the end of the hose. The fitting includes a gripping section and a sealing section. Throughout the gripping section, the socket and the nipple are provided with a plurality of radial projections which grip the wire reinforcement of the hose, and the radial width of the opening in the gripping section is substantially constant over its axial length. Rearwardly of the gripping section is the sealing section wherein a fluid tight seal is provided between the inner tube of the hose and the nipple.

In a method of assembling the fitting on a hose, the socket is positioned over the end of the hose, the nipple is inserted through the socket and into the end of the hose and the nipple is threaded to the socket. Alternatively, the nipple may be inserted through the socket and brazed thereto, and the hose then inserted through the opening between these two members. The hose and fitting assembly is then positioned in a crimping or swaging apparatus. Hereinafter the term crimping is intended to include both crimping and swaging operations. Such apparatus includes crimping dies which are constructed so that the gripping section of the fitting is crimped first and, after the wire reinforcement is in crimped position, the sealing section of the fitting is crimped.

In greater detail, FIG. 1 illustrates a hose fitting, indicated generally by the numeral 10 connected to the end of a hose, indicated generally by the numeral 11.

With reference to FIG. 2, the hose 11 includes an inner tube 12 made of a resilient material such as rubber or similar material, a wire reinforcement 13 covering the inner tube 12 and a cover 14 over the reinforcement 13, the cover 14 also being made of a resilient material such as rubber or other similar material. The inner tube 12 of the hose 11 is cut away from the end of the hose as shown in FIG. 2 to expose the inner surface of the wire reinforcement 13, and the outer cover 14 is also cut away a distance approximately twice that of the inner tube 12 to expose the outer surface of the wire reinforcement 13.

The hose fitting 10 comprises a socket 17 and nipple 18, the socket 17 being adapted to be positioned around the end of the hose 11 and the nipple 18 being adapted to be inserted into the end of the hose 11. The nipple 18 is positioned within the socket 17 in telescopic relation therewith and these two members are secured together by a threaded connection indicated generally by the numeral 19. An enlarged portion 20 having a wrench engaging outer surface is also formed on the nipple, and the forward end of the nipple may be provided with means (not shown) such as a swivel nut for attaching the fitting to another coupling member (not shown).

An annular opening, closed at the forward end, is provided between the socket 17 and the nipple 18, into which the hose 11 extends. The forward section of the fitting 10 from the closed end of the opening to substantially the end 22 of the inner tube 12 is referred to as the gripping section, and the rearward section from the end 22 of the tube 12 to the end 23 of the outer cover 14 is referred to as the sealing section. In the gripping section, the socket 17 and the nipple 18 are provided with substantially identical, axially spaced, radially extending projections 24 and 25 respectively. In the embodiment illustrated, the projections 24 and 25 have slanted sides and flat tops. As shown in FIG. 2, the projections 24 on the socket 17 are radially aligned with the recesses between the projections 25 of the nipple 18 and vice versa, which makes the opening in the gripping section generally sinusoidal.

The opening between the nipple 18 and the socket 17 is enlarged in the area indicated by the numeral 26 adjacent the forward end to prevent cutting of the wire reinforcement during crimping. The wire has a tendency to double back or bunch at the forward end of the opening when it is inserted, and the enlarged area 26 eliminates the danger of cutting or tearing the wire 13 when doubling back occurs and the socket 17 is crimped.

In the sealing section of the fitting 10, the outer periphery of the nipple 18 is provided with a plurality of radially outward extending ribs having round upper surfaces. The ribs 29 at approximately the center of the sealing section have a sharp annular form as shown in FIG. 4, while the ribs 30 rearward and the ribs 31 forward of the ribs 29 have a rounded annular form. The ribs 30, as well as the ribs 31, are preferably spaced farther apart from each other than the ribs 29. The inner periphery of the socket 17 at the sealing section may be provided with a plurality of radially inward extending ribs 33 which may be annular or in the form of threads. The ribs 29 are preferably sharp cornerd and have a buttress type configuration. The socket 17 at the rearward end of the fitting is further provided with an axially extending skirt portion 34.

In a method of assembling the fitting 10 on the hose 11, the hose is first prepared by cutting away the inner tube 12 and outer cover 14 to expose the wire reinforcement 13. The length of the tube 12 removed is substantially equal to the length of the gripping section and the length of the cover 14 removed is substantially equal to the overall length of the gripping and sealing sections. The socket is positioned over the end of the hose and the nipple is inserted through the socket and into the end of hose and secured to the socket. In the case of one piece brazed construction the socket and the nipple are brazed together and then the end of the hose is inserted into the annular opening between them. From FIG. 2 it can be seen that the radial width of the opening between the socket and the nipple before crimping is made sufficiently large that the hose 11 can be positioned in the fitting relatively easily. The fitting 10 and hose 11 assembly is then positioned in a crimping or swaging apparatus (not shown) and the gripping section of the fitting 10 is crimped first. The gripping section of the fitting when crimped as shown in FIG. 3 applies a radially compressive load on the hose reinforcement 13 that is constant in the axial direction because the radial width of the opening is constant. Thereafter the sealing section of the fitting 10 is crimped, the finished structure being shown in FIG. 4. A fluid tight seal is produced between the nipple 19 and the inner tube 12, and the ribs 27, 30 and 31 on the nipple help to maintain the seal by preventing movement of the inner tube. The skirt 34 of the socket is also crimped, but by a lesser amount, against the cover 14 and prevents the hose from being bent at a sharp angle immediately outside of the fitting. The skirt 34 also bears against the cover 14 to provide a fluid tight seal which protects the wire reinforcement 13 from moisture or a corrosive atmosphere entering from the outside.

By crimping the gripping section first, the wire reinforcement 13 is allowed to move and settle in its final crimped position before a load is applied on the portion of the hose in the sealing section. If the sealing section were crimped first or both sections were crimped simultaneously a portion of the wire in the gripping section might move during the crimping of the gripping section and cause the seal between the nipple and the inner tube 12 in the sealing section to be lost. By crimping the two sections at different times and the gripping section first, this possibility is removed.

Due to the substantially identical configurations of the projections 25 and 24 on the nipple and the socket and the offset relation of the projections in the gripping section, the opening in this section has a substantially constant width and is gradually curved, preferably having a sinusoidal shape. This is advantageous because sharp bends of the wire are avoided, thereby reducing the danger of wire damage during crimping. Further, gripping does not depend solely on friction as in conventional compression fittings. A sine wave fitting of the character disclosed differs from the usual compression fittings in that end thrust transmitted to the reinforcement 13 is not transmitted longitudinally but obliquely, and the thrust is therefore a vector value less than direct thrust.

For example, for a hose fitting assembly (FIG. 5) wherein the hose has certain inner diameter D and a certain minimum burst pressure P, the end, or axial, thrust on the wire reinforcement 13 at the point indicated by the numeral 36, which is rearwardly of the first bend in the reinforcement, is F pounds. The value F is derived from the equation $$F = \frac{p\pi D^2}{4}$$

where $\pi = 3.1416$.

In the construction shown, the slanting sides of the projections 24 and 25 on the socket and the nipple make an angle $a$ with an axial line, and therefore the portion of the reinforcement in the first bend, which is just forward of the point 36, also has the same angle $a$. FIG. 6 is a vector diagram showing the forces on the portion of the reinforcement, which is adjacent the first bend. The right triangle has an angle $a$ between a side X, which has a length proportional to F pounds, and a side Y. Since $$\cos a = \frac{Y}{X}$$

then $Y = X \cos a$. Hence Y is proportional to the thrust on the portion of the reinforcement at the point indicated by the numeral 37, which is just forward of the first bend. For any finite angle $a$, $\cos a$ is less than 1 and therefore the end thrust Y at the point 37 will be less than the thrust X at the point 36.

From the foregoing it is apparent that the difference between the end thrust on the portions of the reinforcement at the points 36 and 37 depends upon the angle at which the reinforcement 13 is bent. If the angle were 90° the end thrust on the portion of the reinforcement after the bend would be zero, but such a sharp bend would be undesirable because the wire reinforcement might crack at the bend. On the other hand, if the angle were zero, the entire end thrust would be transmitted and gripping of the reinforcement would be by friction only. Factors affecting the choice of the angle of bend are the diameter of the hose, the thickness of the reinforcement, and the stiffness of the wire used in the reinforcement.

The shape of the projections 24 and 25 on the socket and the nipple are such as to produce the sine wave configuration of the reinforcement when the socket is swaged. The surface of the projections need not be curved as in a true sine wave but may have flat sides and crests as shown. The crests are preferably provided so that the reinforcement will not be sharply bent over the projections.

Forward of the point 37, the reinforcement 13 extends straight outwardly at the angle $a$, and the end thrust on it gradually decreases due to frictional gripping of the reinforcement caused by compression of this portion of the reinforcement between the socket and the nipple. Consequently, the thrust on the portion of the reinforcement 13 at the point 38, which is just rearward of the second bend, is less than the value Y.

The reinforcement is then bent at an angle $a$, and at the point 39, which is just forward of the second bend, the thrust is again reduced by an amount which may be determined by a vector analysis similar to that for the first bend.

Forward of the point 39 the reinforcement again extends in a straight line for a short distance and an additional amount of thrust is lost due to friction. In the construction shown and described, there are numerous bends and straight portions in the hose reinforcement and the thrust on the reinforcement gradually decreases to zero at or before the end of the reinforcement.

An advantage of the foregoing fitting construction is that it is highly effective with hose having a standard type of reinforcement made up of layers of wire which spiral around the hose with adjacent layers oppositely spiraling, in addition to a standard type hose wherein the reinforcement comprises wire strands which are woven or braided, each strand comprising a plurality of wires. In the former spiral construction, each layer of wire is separated from adjacent layers by an interlay of relatively soft material. Therefore, the wires of adjacent layers normally do not touch each other. In the braided construction on the other hand, the braided strands are in metal-to-metal contact where they are bent over and under each other.

It has been found that a hose used in a system where internal hose pressure is alternately applied and released, the hose alternately radially expands and contracts. Such operation with a hose having a braided reinforcement results in relatively rapid hose wear because the previously mentioned metal-to-metal contact causes rapid wear. This problem has necessitated the use of relatively thin, flexible wire, which has the disadvantage of being relatively weak.

In the spiral construction on the other hand, adjacent layers of wire are maintained out of contact by the interlay and consequently the problem of metal-to-metal contact and resulting wear does not exist. Therefore it has been possible to use stronger and stiffer wire in this type of hose.

Since hose having the spiral construction would be made stronger than hose having the braided construction for approximately the same wall thickness, it would seem that the spiral construction is preferable for high pressure applications. The spiral construction has not always been used however because conventional hose fittings are not able to grip the spiral constructions tightly enough to prevent blow-off at high pressure. Conventional fittings include teeth on the nipple and the socket which are designed to compress and dig into the bared reinforcement in order to grip it. However, the outer surface of the reinforcement of a spiral construction is relatively smooth and therefore the teeth are not able to dig deeply into the reinforcement. For braided hose, on the other hand, the outer surface of the reinforcement is relatively rough and the teeth are able to dig into the reinforcement and grip it. Conventional fittings are accordingly usually used with braided hose because they can grip it, but of course such a hose and fitting assembly does not have as high pressure rating as is often desired.

An advantage of a fitting constructed in accordance with this invention is that it is able to firmly grip either a braided or a spiral hose at the rated pressure of the hose. For a fitting and hose of the spiral construction, the maximum rated pressure may be very high because the hose may be made relatively strong. The fitting is able to grip the spiral hose because it does not rely for gripping on teeth which must dig into the reinforcement, to be effective. Instead, the fitting bends and compresses the reinforcement in order to grip it, which has the advantage not only of providing a firm grip but also, there is no tendency to cut or crack the wires of the reinforcement.

In addition, if there is a tendency for the hose to be pulled away from the fitting, the pull may tend to reduce the diameter of the portion of the wire reinforcement in the gripping section causing the wire to tighten around the nipple. The sine wave form disclosed produces a greater tightening effect and a better grip on the hose than heretofore obtained using conventional fittings.

I claim:

1. The combination of a hose including an inner non-metallic tube surrounded by metallic reinforcement of tubular configuration, a portion of said tubular reinforcement at and adjacent to one end of the hose being bared, and a fitting comprising a socket member and a nipple member secured together and providing an annular opening closed at the forward end and receiving said one end of the hose, said socket member and said nipple member being substantially longer than the length of said bared portion of said tubular reinforcement and including therebetween a gripping section near said forward end with said bared tubular reinforcement portion therein and a sealing section rearward of said gripping section, said annular opening in said sealing section being enlarged in radial width relative to said gripping section to receive both said reinforcement and said inner tube, and means on said socket member and said nipple member in said gripping section providing a sinusoidal form for said annular opening in said gripping section along substantially the length and circumference of said gripping section and clamping said bared tubular reinforcement portion and bending the same into a sinusoidal configuration to prevent a rearwardly directed thrust on the hose relative to the fitting from separating the hose from the fitting, said means comprising at least one circumferentially continuous radially extending preformed annular relatively blunt projection on one of said members, said projection having slanting sides, the other member having at least one circumferentially continuous annular groove radially opposite said projection and having slanting sides generally parallel to the slanting sides of said projection, said projection and said groove having mating configurations and the radial width of said annular opening being substantially constant throughout its length and circumference, whereby said reinforcement is bent into a smoothly curving sinusoidal form by said projection and said groove and the compressive force on said bared reinforcement portion is substantially constant throughout the length and circumference of the gripping section, said bending of said reinforcement into said sinusoidal configuration being effective to establish a firm grip on said hose by said fitting by bending and compressing said bared reinforcement portion and without any substantial biting into said bared reinforcement portion, and each bend of said bared reinforcement portion gradually reducing in the forward direction the amount of the rearwardly directed thrust on said bared reinforcement portion, the portions of the annular opening adjacent both of said slanting sides of said projection extending substantially lengthwise of the fitting and having a radial width substantially equal to the radial width of the portion of said opening between said projection and said groove.

2. The combination of a hose having a non-metallic inner tube surrounded by wire reinforcement of tubular configuration, the portion of the tubular reinforcement at and adjacent one end of the hose being bared, and an end fitting for said hose comprising a one-piece generally cylindrical socket member received on said one end of said hose and having a length substantially greater than that of said tubular reinforcement bared end portion, and a nipple member secured within and to said socket member and received within said one end of said hose, said nipple member having a length substantially greater than that of said tubular reinforcement bared end portion, the end portion of said nipple member being sealingly engaged within said non-metallic inner tube, the opposed wall portions of said socket member and said nipple member within the region of said tubular reinforcement bared end portion defining a gripping section including means for gripping the hose to prevent a rearwardly directed thrust on the hose relative to the fitting from separating the hose from the fitting, said gripping means including at least two axially spaced circumferentially continuous annular radially extending relatively blunt preformed projections on the internal wall of said socket member within said gripping section, one of said projections having oppositely slanting sides and a crest, and the other projection including a side slanting oppositely to the confronting side of said one projection and a crest of a diameter substantially corresponding to that of the crest of said one projection, at least two axially spaced, circumferentially continuous annular radially extending relatively blunt preformed projections on said nipple member within said gripping section, one of said projections being positioned between said projections on said socket member and having oppositely slanting sides and a crest, and the other projection being spaced axially inwardly of and including a side slanting oppositely to the confronting side of said one nipple member projection and a crest of a diameter substantially corresponding to that of the crest of said one nipple member projection, said one projection on said socket member being positioned between said projections on said nipple member, said projections and the wall portions disposed therebetween defining an annular space of sinusoidal configuration along the length of said gripping section, said space after assembly of the fitting on the hose having a substantially uniform width throughout its length and circumference less than the radial thickness of said tubular reinforcement before assembly and thereby being in clamping engagement with the bared portion of said tubular reinforcement and bending the same into a sinusoidal configuration, the clamping engagement of the bared portion and the bending thereof into a smoothly curving sinusoidal configuration firmly gripping the reinforcement independently of any gripping action effected by the sealing engagement of said nipple member with said non-metallic inner tube and thereby preventing the hose from becoming detached from the fitting under extreme pressure conditions, whereby the compressive force on said bared reinforcement portion is substantially constant throughout the length and circumference of said gripping section, said bending of said bared reinforcement portion into said sinusoidal configuration being effective to establish a firm connection between said hose and said fitting by bending and compressing said bared reinforcement portion and without any substantial biting into said bared reinforcement portion, and each bend of said bared reinforcement portion reducing in the forward direction the amount of the rearwardly directed thrust on said bared reinforcement portion.

3. An end fitting for a hose having a non-metallic inner tube surrounded by wire reinforcement of tubular configuration, the portion of the tubular reinforcement at and adjacent one end of the hose being bared, said fitting comprising a one-piece generally cylindrical socket member having a length substantially greater than that of said bared end portion of said tubular reinforcement, a generally tubular nipple member secured concentrically within and to said socket member to define therewith an annular opening closed at its inner end and open at its outer end, said nipple member having a length substantially greater than that of said bared end portion of said tubular reinforcement and including an end portion adapted to be received in sealing engagement within the outer end portion of said non-metallic inner tube, the opposed wall portions of said socket member and said nipple member in a region near the inner end of said nipple member defining a gripping section for receiving and gripping said bared portion of said tubular reinforcement, the length of said region being about equal to the length of said bared portion, the portion of said annular opening adjacent said end portion of said nipple being enlarged in radial width relative to the portion of said annular opening in said gripping section to receive both said reinforcement and said inner tube, a first circumferentially continuous annular radially extending preformed projection positioned on the internal wall of said socket member near the inner end of said region and including a pair of oppositely slanting sides and a first crest, a second circumferentially continuous annular radially extending preformed projection positioned on the internal wall of said socket member and being spaced axially outwardly from said first projection and including a side slanted oppositely to the confronting side of said first projection and a second crest of a diameter substantially corresponding to that of said first crest, the socket member wall portion extending between said first and second projections being cylindrical, a third circumferentially continuous annular radially extending projection preformed positioned on said nipple member between said first and second projections and including a pair of oppositely slanting sides and a third crest, said third crest confronting and having a width less than the axial length of said socket member cylindrical wall portion extending between said first and second projections, and a fourth circumferentially continuous annular projection preformed positioned on said nipple member and being spaced axially inwardly from said third projection, and including a side slanting oppositely to the confronting side of said third projection and a fourth crest of a diameter corresponding to that of said third crest, the nipple member wall portion extending between said third and fourth projections being cylindrical and confronting said first crest and being of greater axial length than the width of said first crest, said continuous socket member being contractible about said nipple member, the difference between the diameters of said first and second crests and said third and fourth crests before said socket is contracted being slightly greater than the radial thickness of said tubular reinforcement, and said projections and the cylindrical wall portions extending therebetween together defining an annular space of sinusoidal configuration along the length thereof, said space after contraction of said socket member being of substantially uniform width throughout the length and circumference of said region, whereby when said socket member is contracted said tubular reinforcement will be clamped and bent in a sinusoidal configuration between said projections and the cylindrical wall portions extending therebetween and said fitting grips said reinforcement by bending and compressing said reinforcement and without any substantial biting into said reinforcement.

References Cited

UNITED STATES PATENTS

| 2,550,583 | 4/1951 | Millar | 285—149 |
| 2,661,225 | 12/1953 | Lyon | 285—149 |
| 2,865,094 | 12/1958 | Press | 285—258 |
| 3,142,503 | 7/1964 | Stranberg | 285—243 |

FOREIGN PATENTS

| 565,460 | 3/1958 | Belgium. |
| 1,231,365 | 4/1960 | France. |
| 334,935 | 9/1930 | Great Britain. |
| 770,050 | 3/1957 | Great Britain. |
| 129,904 | 10/1959 | Russia. |

CARL W. TOMLIN, *Primary Examiner.*

THOMAS F. CALLAGHAN, *Examiner.*

R. GIANGIORGI, *Assistant Examiner.*